(12) United States Patent
Soler et al.

(10) Patent No.: US 10,173,644 B1
(45) Date of Patent: Jan. 8, 2019

(54) ACTIVATION METHOD AND SYSTEM FOR THE TIMED ACTIVATION OF A VEHICLE CAMERA SYSTEM

(71) Applicants: Vidal M. Soler, Miami, FL (US); Nersa Soler, Miami, FL (US); Myrna Trenchard, Homestead, FL (US)

(72) Inventors: Vidal M. Soler, Miami, FL (US); Nersa Soler, Miami, FL (US); Myrna Trenchard, Homestead, FL (US)

( * ) Notice: Subject to any disclaimer, the term of this patent is extended or adjusted under 35 U.S.C. 154(b) by 151 days.

(21) Appl. No.: 15/422,211

(22) Filed: Feb. 1, 2017

Related U.S. Application Data

(60) Provisional application No. 62/290,655, filed on Feb. 3, 2016.

(51) Int. Cl.
*B60R 25/30* (2013.01)
*B60R 25/33* (2013.01)
*H04N 7/18* (2006.01)
*H04N 5/77* (2006.01)

(52) U.S. Cl.
CPC .......... *B60R 25/305* (2013.01); *B60R 25/302* (2013.01); *B60R 25/33* (2013.01); *H04N 5/77* (2013.01); *H04N 7/183* (2013.01); *H04N 7/188* (2013.01)

(58) Field of Classification Search
CPC ...................................................... B60R 25/30
See application file for complete search history.

(56) References Cited

U.S. PATENT DOCUMENTS

| | | | |
|---|---|---|---|
| 5,027,104 A | 6/1991 | Reid | |
| 5,680,123 A | 10/1997 | Lee | |
| 5,793,420 A | 8/1998 | Schmidt | |
| 5,978,017 A | 11/1999 | Tino | |
| 6,002,326 A | 12/1999 | Turner | |
| 6,014,163 A | 1/2000 | Houskeeper | |
| 6,151,065 A | 11/2000 | Steed et al. | |
| 6,211,907 B1 | 4/2001 | Scaman et al. | |
| 6,333,759 B1 | 12/2001 | Mazzilli | |
| 6,795,111 B1 | 9/2004 | Mazzilli | |
| 7,697,028 B1 | 4/2010 | Johnson | |
| 8,934,011 B1* | 1/2015 | Soler | B60R 25/305 348/143 |
| 2002/0130953 A1 | 9/2002 | Riconda et al. | |
| 2002/0171738 A1 | 11/2002 | Guan | |
| 2003/0041329 A1 | 2/2003 | Bassett | |

(Continued)

*Primary Examiner* — Thai Q Tran
*Assistant Examiner* — Girumsew Wendmagegn
(74) *Attorney, Agent, or Firm* — H. John Rizvi; Gold & Rizvi, P.A.

(57) ABSTRACT

An activation method and system is provided that, in response to an external signal, initiates a timed activation of a vehicle camera system, including for instance a series of cameras and a digital video recorder. The disclosed activation system generally includes a system control module having a timer and a series of relays connected to external devices such as, for example, an alarm system, an ignition system, etc. The relays receive signals from an external source and trigger the system control module to send a timed signal to the vehicle camera system. The activation system may also include a beeper control module including a beeper and connected to the timer such that the timer is activated in response to an external signal transmitted to the beeper by an external device such as a smartphone or home alarm system.

20 Claims, 3 Drawing Sheets

(56) References Cited

U.S. PATENT DOCUMENTS

| | | |
|---|---|---|
| 2003/0081127 A1 | 5/2003 | Kirmuss |
| 2004/0145457 A1 | 7/2004 | Schofield et al. |
| 2005/0030379 A1 | 2/2005 | Luskin et al. |
| 2005/0231593 A1 | 10/2005 | Arant |
| 2006/0139488 A1 | 6/2006 | Suzuki et al. |

\* cited by examiner

ACTIVATION METHOD AND SYSTEM FOR THE TIMED ACTIVATION OF A VEHICLE CAMERA SYSTEM

CROSS-REFERENCE TO RELATED APPLICATIONS

This application claims the benefit of U.S. Provisional Patent Application Ser. No. 62/290,655, filed on Feb. 3, 2016, which is incorporated by reference herein in its entirety.

FIELD OF THE INVENTION

The present invention relates generally to vehicle camera systems, and more particularly to an activation method and system for the timed activation of a vehicle camera system. For instance, the activation method and system can activate a series of cameras placed around a vehicle and a digital video recorder system to record images in response to an external signal.

BACKGROUND OF THE INVENTION

It is important in many situations to maintain the security of one's vehicle and/or home. Various camera and alarm systems have been developed to monitor vehicles and homes while the owner is away. Some of these systems utilize multiple cameras, either video or still, to take images of the surroundings and record them on a recording device.

In the context of vehicle security, it is often necessary to monitor the entire periphery of the vehicle to prevent theft and/or identify the sources of a break in or damage to the vehicle. One such system is disclosed in U.S. Pat. No. 8,934,011 to Vidal Soler. The disclosed vehicle security system provides a series of cameras placed around the periphery of a subject vehicle and a digital video recorder to record the images and combine them into a mosaic of images for viewing by the owner. The mosaic of images can be viewed within the vehicle or transmitted to a remote screen for viewing.

Most often, there is no need for continuous video recording of the surroundings of a vehicle. The need to video record the surroundings most arises when there is an incident such as the triggering of an alarm system or the activation of a designated ignition switch. Additional instances of video recordings may include activation of a home alarm system when the subject vehicle is located within a home garage or in the home driveway or activation of a panic button on a key fob. In other instances, a user tray wish to activate the cameras and video recording system remotely from a smartphone or other transmitter device in response to a perceived concern about the safety of the vehicle.

Accordingly, there is an established need for a vehicle camera and recorder activation system that can provide an activation of a series of cameras and a digital video recorder for a predetermined amount of time and in response to an incident occurring at the vehicle.

SUMMARY OF THE INVENTION

The present invention is directed to an activation method and system for the timed activation of a vehicle camera system, the vehicle camera system for instance including a series of video cameras placed around a vehicle and a digital video recorder for recording the images received from the video cameras. The system can also provide a timed activation of a geolocation tracker (e.g., GPS tracker) located within the vehicle. The activation system includes a system control module having a timer and a series of relays for activating the timer. The timer is provided to send an activation signal to the cameras and the digital video recorder for a preset amount of time. The relays receive activation signals from external sources such as, for example, an alarm system, an ignition system or the like and send a triggering signal to a trigger of the timer to initiate a timed operation of the video cameras and the digital video recorder. The activation system may also include a beeper control module having a beeper and a series of relays. The beeper is provided for receiving an external signal from a wireless source such as, for example, a smartphone, a home alarm system or the like and activating the relays to send a triggering signal to the trigger of the timer.

In a first implementation of the invention, an activation system for providing timed activation of a vehicle camera system in response to an external signal includes a timer and a triggering relay. The timer has a common input connected to an electrical power source, a trigger input, a normally open output connected to at least one electronic device of a vehicle camera system, and a normally closed output. The timer is switchable, in response to a triggering voltage being applied to the trigger input, from an initial position, in which the common input is connected to the normally closed output, to an activated position, in which the common input is connected to the normally open output, and in which electrical power from the electrical power source is provided to the at least one electronic device of the vehicle camera system for a predetermined amount of time. The triggering relay, in turn, includes a common input, a positive voltage input, a negative voltage input, a normally closed output, a normally open output and a relay contact. The common input of the triggering relay is connected to an electrical power source. The normally open output of the triggering relay is connected to the trigger input of the timer. The relay contact is switchable, in response to a voltage being applied between the positive and negative voltage inputs of the triggering relay, from an initial position connecting the common input of the triggering relay to the normally closed output of the triggering relay, to an activated position. In the activated position of the relay contact, the relay contact connects the common input of the triggering relay to the trigger input of the timer via the normally open output of the triggering relay; also, in the activated position of the relay contact, the electrical power source connected to the common input of the triggering relay provides the triggering voltage to the trigger input of the timer.

In a second implementation of the invention, an activation system for providing timed activation of a vehicle camera system in response to an external signal includes a timer. The timer has a common input connected to an electrical power source, a trigger input, a normally open output connected to at least one electronic device of a vehicle camera system, and a normally closed output. The timer is switchable, in response to a triggering voltage being applied to the trigger input, from an initial position in which the common input is connected to the normally closed output, to an activated position in which the common input is connected to the normally open output, and in which electrical power from the electrical power source is provided to the at least one electronic device of the vehicle camera system for a predetermined amount of time. The activation system further includes at least one of a vehicle alarm system and a vehicle ignition system electrically connected to the trigger input of the timer and configured to provide the triggering voltage to the trigger input.

In yet another implementation of the invention, an activation system for providing timed activation of a vehicle camera system in response to an external signal comprises a timer. The timer includes a common input, a normally open output, a normally closed output and a trigger input, wherein the common input is connected to an electrical power source and the normally open output is connected to one or more cameras carried by a vehicle. The activation system further includes at least one of a vehicle alarm system and a vehicle ignition system electrically connected to the trigger input of the timer. The timer is switchable, in response to a voltage applied at the trigger input by the at least one of a vehicle alarm system and a vehicle ignition system, between an initial position in which the common input is connected to the normally closed output, and an activated position in which the common input is connected to the normally open output, and in which electrical power from the electrical power source is provided to the one or more cameras for a predetermined amount of time.

These and other objects, features, and advantages of the present invention will become more readily apparent from the attached drawings and the detailed description of the preferred embodiments, which follow.

BRIEF DESCRIPTION OF THE DRAWINGS

The preferred embodiments of the invention will hereinafter be described in conjunction with the appended drawings provided to illustrate and not to limit the invention, where like designations denote like elements, and in which.

Like reference numerals refer to like parts throughout the several views of the drawings.

DETAILED DESCRIPTION

The following detailed description is merely exemplary in nature and is not intended to limit the described embodiments or the application and uses of the described embodiments. As used herein, the word "exemplary" or "illustrative" means "serving as an example, instance, or illustration." Any implementation described herein as "exemplary" or "illustrative" is not necessarily to be construed as preferred or advantageous over other implementations. All of the implementations described below are exemplary implementations provided to enable persons skilled in the art to make or use the embodiments of the disclosure and are not intended to limit the scope of the disclosure, which is defined by the claims. For purposes of description herein, the terms "upper", "lower", "left", "rear", "right", "front", "vertical", "horizontal", and derivatives thereof shall relate to the invention as oriented in FIG. 1. Furthermore, there is no intention to be bound by any expressed or implied theory presented in the preceding technical field, background, brief summary or the following detailed description. It is also to be understood that the specific devices and processes illustrated in the attached drawings, and described in the following specification, are simply exemplary embodiments of the inventive concepts defined in the appended claims. Hence, specific dimensions and other physical characteristics relating to the embodiments disclosed herein are not to be considered as limiting, unless the claims expressly state otherwise.

Shown throughout the figures, the present invention is directed toward an activation method and system for the timed activation of a vehicle camera system, such as but not limited to a vehicle camera system comprising vehicle cameras and digital video recorder. The activation method and system allows initiating a timed activation of the vehicle camera system in response to inputs received from an alarm system, an ignition system or an external device. The external device can communicate with the activation system using a beeper system which can communicate with a beeper control module included in the activation system.

Figure 1:
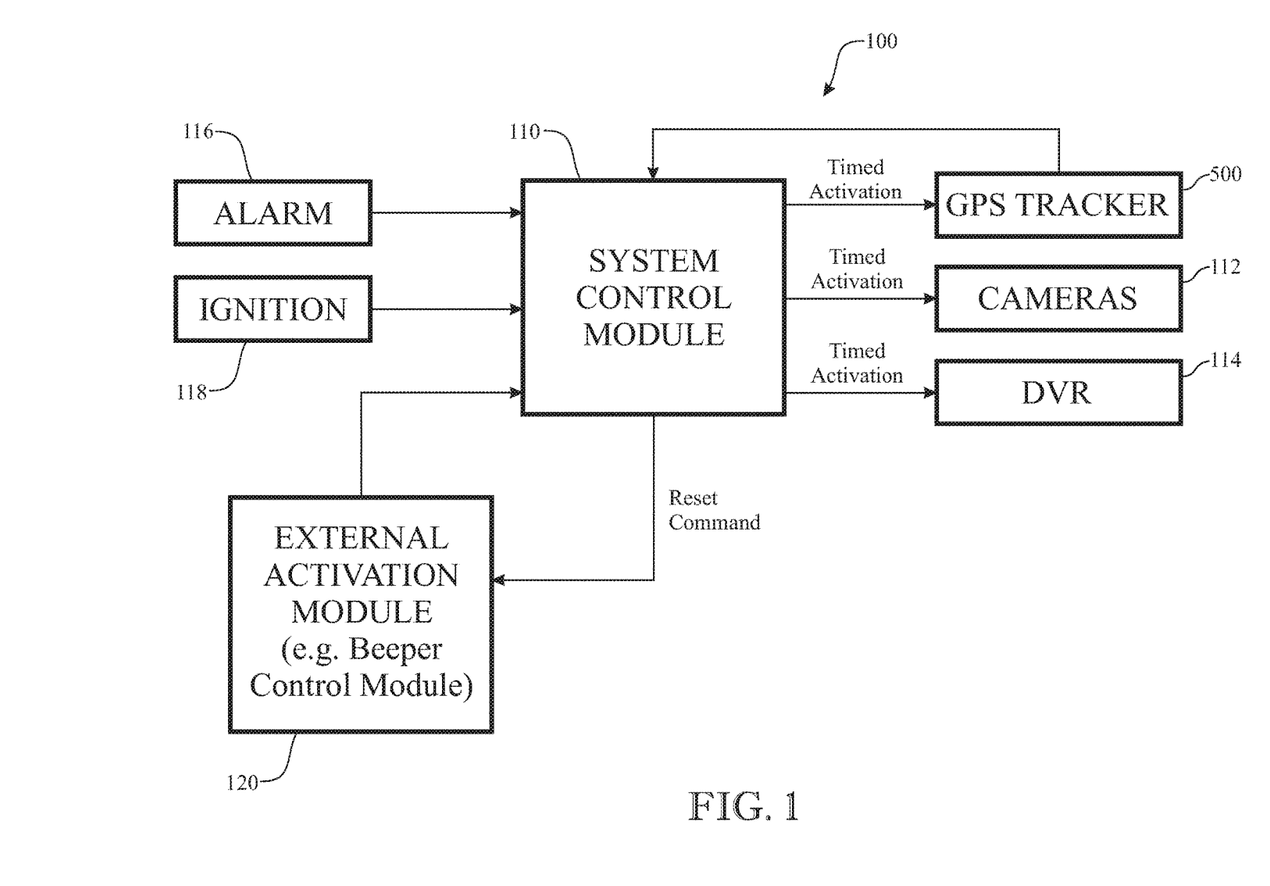
FIG. 1 presents an overview block diagram of an activation system in accordance with an exemplary embodiment of the invention, for activating a GPS tracker and a vehicle camera system, the vehicle camera system including vehicle cameras and a Digital Video Recorder (DVR) for the recording of camera images.

Referring initially to FIG. 1, an activation system 100 for the timed activation of a vehicle camera system is illustrated in block diagram form in accordance with an exemplary embodiment of the present invention. As shown, the activation system 100 generally includes an activation or system control module 110 connected to a vehicle camera system. For instance and without limitation, the vehicle camera system can include one or more cameras 112 placed around a periphery of a subject vehicle (not shown) and a digital video recorder (DVR) 114 such as those described in U.S. Pat. No. 8,934,011 to Vidal Soler, in which the camera video images are converted into a single video image in mosaic format, reflecting a 360° view around the subject vehicle for viewing by an operator either directly within the subject vehicle or remotely. Alternative vehicle camera systems may be used, however, in combination with the activation system and method of the present disclosure.

In some embodiments, as shown, the system control module 110 can further control a geolocation tracker device (for instance, a GPS tracker 500) located in, or carried by, the vehicle. As commonly known in the art, when activated, a geolocation tracker device can provide a quite precise position of the device (and thus of the vehicle carrying the device). In some embodiments, the geolocation device can provide real-time position information of the device. Alternatively or additionally, the geolocation device can store the position information and/or transmit the position information to a remote device such as, but not limited to, a remote security station or a remote user's smartphone over a network (e.g., the Internet).

As shown in FIG. 1, the system control module 110 receives activation signals or inputs from outside sources such as, for example, an alarm system 116 or an ignition system 118 and activates the geolocation tracker device and the vehicle camera system, and more particularly the GPS tracker 500, the cameras 112 and the DVR 114, for a preset amount of time.

The activation system 100 further includes an external activation module or, in this embodiment, a beeper control module 120 which is also connected to the system control module 110 and activates or triggers the system control module 110 in response to an external signal, external being understood as external to the vehicle. On receipt of an activation or trigger signal by the system control module 110 from the beeper control module 120, the system control module 110 initiates timed activation of the GPS tracker 500, cameras 112 and DVR 114. Once the timed activation of the GPS tracker 500, cameras 112 and DVR 114 has been initiated, the system control module 110 resets the beeper control module 120 in a manner described in more detail hereinbelow.

Figure 2:
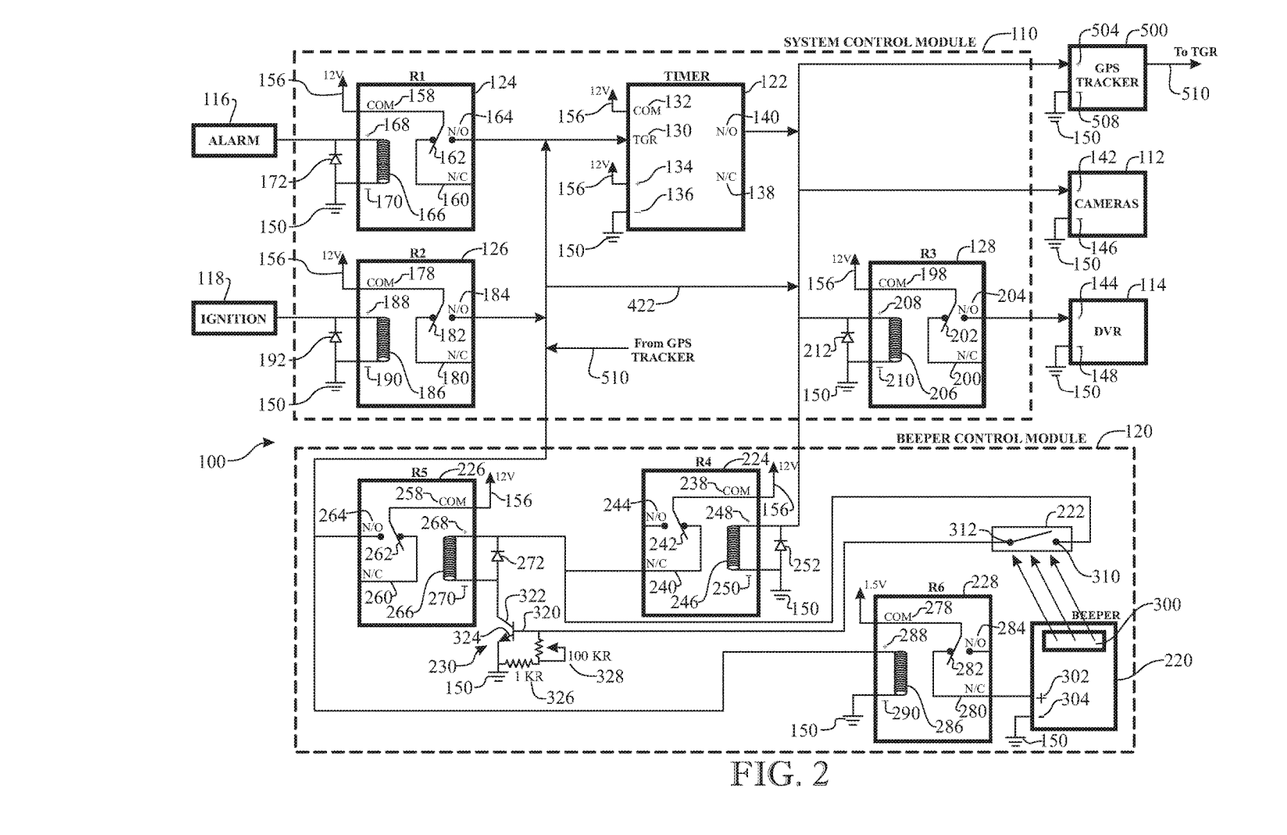
FIG. 2 presents a detailed schematic diagram of the activation system of FIG. 1, particularly describing the system control module and beeper control module of the system.

Turning now to FIG. 2, the details of the system control module 110 and the beeper control module 120 will now be described. The system control module 110 generally includes a timer 122 and a system of relays including a triggering, first relay 124 (also indicated as R1 in the figure), a triggering, second relay 126 (also indicated as R2) and an additional, third relay 128 (also indicated as R3). The first and second relays 124 and 126 receive inputs or triggering signals from the alarm system 116 and the ignition system 118, respectively, and send an activation signal to the timer 122 to initiate activation of the GPS tracker 500 and the cameras 112. The third relay 128 receives an output from the timer 122 and initiates activation of the DVR 114.

The timer 122 is an adjustable timer such as, for example, an ELK-960 Delay Timer produced by Elk Products, Inc., Hildebran, N.C., U.S.A. The timer 122 generally includes a trigger (TRG) input 130, a common (COM) input 132, a positive voltage (+) input 134, a negative voltage (−) contact 136, a normally closed (N/C) output 138 and a normally open (N/O) output 140. The positive voltage (+) input 134 and the negative voltage (−) contact 136 are connected to the vehicle 12 V voltage system 156 and the common ground 150, respectively, to power the timer 122. A predetermined time can be configured in the timer 122, so that upon activation of the trigger (TRG) input 130, the normally open (N/O) output 140 is energized (connected to the common (COM) input 132) during the predetermined time, regardless of the duration of the energizing of the trigger (TRG) input 130; for instance, the predetermined time can be adjusted from 1 to 60 minutes, wherein an exemplary predetermined time of 15 minutes will be used for reference in the present description. As shown in the figure, the trigger (TRG) input 130 receives activation signals from the first and second relays 124 and 126, and thus the first and second relays 124 and 126 activate the timer 122. In turn, the normally open (N/O) output 140 of the timer 122 is connected to a positive voltage (+) input 504 of the GPS tracker 500, to a positive voltage (+) input 142 of the cameras 112 and to a positive voltage (+) input 144 of the DVR 114 through the third relay 128 to initiate the GPS tracker 500, cameras 112 and DVR 114 for a predetermined time. Negative voltage (−) contacts 508, 146 and 148 of the GPS tracker 500, cameras 112 and DVR 114, respectively, are connected to a common ground 150 to complete the electrical circuits through the GPS tracker 500, the cameras 112 and the DVR 114.

The first, second and third relays 124, 126 and 128, respectively, are identical and the following detailed description regarding how the relays 124, 126 and 128 operate will be given with regard to the first relay 124. The first relay 124 is of a mechanical type commonly available and generally includes a common (COM) input 158 initially connected to a normally closed (N/C) output 160 via a movable relay contact 162. The movable relay contact 162 is movable between an initial or deactivated position connected to the normally closed (N/C) output 160 to a second or activated position connected to a normally open (N/O) output 164 of the first relay 124 to send a signal to the timer 122. Specifically, the normally open (N/O) output 164 of the first relay 124 is connected to the trigger (TRG) input 130 of the timer 122. The common (COM) input 158 is connected to a voltage source (e.g. the vehicle 12 V voltage system 156) and thus, a voltage of 12 V is provided to the normally closed (N/C) output 160 or the normally open (N/O) output 164 in dependence of the position of the movable relay contact 162.

In order to move the relay contact 162 between the initial and activated positions, the first relay 124 further includes a magnetic coil 166 positioned between a positive voltage (+) input 168 and a negative voltage (−) contact 170 of the first relay 124. The positive voltage (+) input 168 is connected to the alarm system 116 while the negative voltage (−) contact 170 is connected to the common ground 150. A diode 172 is positioned across the positive voltage (+) input 168 and the negative voltage (−) contact 170 to control the direction of current flow across the magnetic coil 166.

When the alarm system 16 is activated, the first relay 124 is activated by the alarm system 116 and a voltage is applied between the positive voltage (+) input 168 and the negative voltage (−) contact 170 to energize the magnetic coil 166. When the magnetic coil 166 is energized, the magnetic coil 166 moves the relay contact 162 from the initial position, in which the relay contact 162 is connected to the normally closed (N/C) output 160, to the alternative position, in which the relay contact 162 is connected to the normally open (N/O) output 164. This connects the common (COM) input 158 to the normally open (N/O) output 164 and thus provides a 12 V voltage to the trigger (TRG) input 130 of the timer 122 for as long as the magnetic coil 166 is energized. When the alarm system 116 is deactivated, the voltage across the magnetic coil 166 ceases and the relay contact 162 returns to its initial position connected to the normally closed (N/C) output 160 of the first relay 124. This in turn ceases the provision of a 12V voltage to the trigger (TRG) input 130 of the timer 122.

It should be noted that, while the disclosed activation system 100 is illustrated and described utilizing mechanical relays, it is within the contemplated scope of the present invention to utilize other types of relays such as, for example, electronic or digital relays, etc.

As noted above, the second and third relays 126 and 128 are constructed and function identically to the first relay 124. For example, the second relay 126 is positioned between the ignition system 118 and the timer 122, and generally includes a common (COM) input 178 connected to a voltage source (e.g. the vehicle 12 V voltage system 156) and initially connected to a normally closed (N/C) output 180 via a relay contact 182. The relay contact 182 is movable between the initial or deactivated position, in which the relay contact 182 is connected to the normally closed (N/C) output 180, and a second or activated position, in which the relay contact 182 is connected to a normally open (N/O) output 184 of the second relay 126. The normally open (N/O) output 184 is connected to the trigger (TRG) input 130 of the timer 122. A magnetic coil 186 is provided to move the relay contact 182, and is connected to a positive voltage (+) input 188 and a negative voltage (−) contact 190 of the second relay 126. The positive voltage (+) input 188 is connected to the ignition system 118 and the negative voltage (−) contact 190 is connected to the common ground 150. A diode 192 spans the positive voltage (+) input 188 and the negative voltage (−) contact 190. When the ignition system 118 is activated, the relay contact 182 moves from the normally closed (N/C) output 180 to the normally open (N/O) output 184 thereby connecting the common (COM) input 178 to the normally open (N/O) output 184 and thus providing a 12 V voltage to the trigger (TRG) input 130 of the timer 122 as long as the magnetic coil 186 is energized.

The third relay 128 is positioned between the normally open (N/O) output 140 of the timer 122 and the positive voltage (+) input 144 of the DVR 114. The third relay 128 generally includes a common (COM) input 198 connected to a voltage source (e.g. the vehicle 12 V voltage system 156) and initially connected to a normally closed (N/C) output 200 in an initial or deactivated position. The third relay 128 further includes a relay contact 202 movable between the initial or deactivated position connected to the normally closed (N/C) output 200 and a second or activated position connected to a normally open (N/O) output 204 of the third relay 128. The normally open (N/O) output 204 is connected to the positive voltage (+) input 144 of the DVR 114. A magnetic coil 206 is provided to move the relay contact 202 and is connected to a positive voltage (+) input 208 and a negative voltage (−) contact 210 of the third relay 128. The positive voltage (+) input 208 is connected to the normally open (N/O) output 140 of the timer 122 and the negative voltage (−) contact 210 is connected to the common around 150. A diode 212 is connected between the positive voltage (+) input 208 and the negative voltage (−) contact 210. When the timer 122 is activated and the normally open (N/O) output 140 of the timer 122 is energized, the magnetic coil 206 of the third relay 128 is energized and the relay contact 202 of the third relay 128 thus moves from the normally closed (N/C) output 200 to the normally open (N/O) output 204, thereby connecting the 12 V at the common (COM) input 198 of the third relay 128 to the positive voltage (+) input 144 of the DVR 114 to activate the DVR 114 for as long as the normally open (N/O) output 140 of the timer 122 is energized.

The operation of the system control module 110 of the activation system 100 to activate the GPS tracker 500, cameras 112 and DVR 114 in response to inputs from the alarm system 116 and/or the ignition system 118 will now be described. As noted above, the first and second relays 124 and 126 are in an initial or first position with their respective common (COM) inputs 158 and 178 are connected to their respective normally closed (N/C) outputs 160 and 180. Thus, no activation signal is being sent to the trigger (TGR) input 130 of the timer 122. The normally open (N/O) output of the timer is therefore not energized, and the third relay 128 is thus also in the initial position with the common (COM) input 198 is connected to the normally closed (N/C) output 200. In consequence, the GPS tracker 500, cameras 112 and DVR 114 are not energized or activated.

When the alarm system 116 is activated for any amount of time, and even for a brief amount of time (e.g. 0.5 seconds), such as by an intruder, accident, remotely, etc., the first relay 124 is energized and switches connecting the common (COM) input 158 to the normally open (N/O) output 164. This provides a 12 V voltage to the trigger (TRG) input 130 of the timer 122 for as long as the alarm is activated. Upon activation of the trigger (TGR) input 130, the timer 122 switches from the first position, in which the common (COM) input 132 is connected to the normally closed (N/C) output 138, to the second position, in which the common (COM) input 132 is connected to the normally open (N/O) output 140, during the predetermined time to which the timer has been previously programmed or adjusted (e.g. 15 minutes). In consequence, a 12 V pulse is provided at the normally open (N/O) output 140 of the timer 122, the pulse having a duration equal to the aforementioned predetermined time. During the duration of the pulse, the normally open (N/O) output 140 of the timer 122 energizes the GPS tracker 500 and cameras 112, causing the GPS tracker 500 to store and/or transmit real-time position information of the vehicle and causing the cameras 112 to record video images during the predetermined time. In addition, the 12 V pulse provided at the normally open (N/O) output 140 of the timer 122 energizes the third relay 128, causing the common (COM) input 198 of the third relay 128 to connect to the normally open (N/O) output 204, and providing a 12 V pulse at the positive voltage (+) input 144 of the DVR 114 which activates the DVR 114 during the predetermined time. Once the predetermined time has expired, the timer 122 switches back to the initial position and the common (COM) input 132 of the timer is disconnected from the normally closed (N/O) output 140, thus ceasing the positive voltage feeding to the GPS tracker 500, cameras 112 and DVR 114 (through the third relay 128). In summary, if the timer 122 is adjusted to a predetermined time of, for instance and without limitation, 15 minutes, any activation of the alarm system 116 will cause the cameras 112 and DVR 114 to produce a 15-minute video recording and the GPS tracker 500 to produce a 15-minute recording and/or sending of the vehicle position information.

A similar situation exists when the ignition system 118 is switched on. In this case, the second relay 126 is activated and connects the common (COM) input 178 to the normally open (N/O) output 184 to send a signal to the trigger (TRG) input 130 of the timer 122 and activate the GPS tracker 500, cameras 112 and DVR 114 (through the third relay 128), as described above with regard to the alarm system 116.

The beeper control module 120 is provided to activate the system control module 110 in response to a remotely transmitted signal from an external device, such as, but not limited to, a smartphone or other device capable of transmitting a signal via a beeper system. The beeper control module 120 depicted herein generally includes a beeper 220, a photoresistor 222, also known as photo-dependent resistor or photocell, and a series of relays similar to those described above including a fourth relay 224, a fifth relay 226 and a sixth relay 228, also indicated in FIG. 2 as R4, R5 and R6, respectively. The beeper control module 120 additionally includes a transistor 230 for activating the fifth relay 226 in response to a signal from the photoresistor 222 as described below.

The fourth, fifth and sixth relays 224, 226 and 228 are essentially identical to the relays described hereinabove. The fourth relay 224 includes a common (COM) input 238, a normally closed (N/C) output 240 initially connected to the common (COM) input 238 through a relay contact 242, a normally open (N/O) output 244, a magnetic coil 246 having a positive voltage (+) input 248 and a negative voltage (−) contact 250, and a diode 252 connected between the positive voltage (+) input 248 and the negative voltage (−) contact 250. The common (COM) input 238 and the negative voltage (−) contact 250 are connected to a voltage source (e.g. the vehicle 12 V voltage system 156) and the common ground 150, respectively. The positive voltage (+) input 248 of the fourth relay 224 is connected to the normally open (N/O) output 140 of the timer 122 of the system control module 110.

Similarly, the fifth relay 226 includes a common (COM) input 258, a normally closed (N/C) output 260 initially connected to the common (COM) input 258 through a relay contact 262, a normally open (N/O) output 264, a magnetic coil 266 having a positive voltage (+) input 268 and a negative voltage (−) contact 270, and a diode 272 connected between the positive voltage (+) input 268 and the negative voltage (−) contact 270. The common (COM) input 258 and the negative voltage (−) contact 270 are connected to a voltage source (e.g. the vehicle 12 V voltage system 156)

and the common ground 150, respectively. The positive voltage (+) input 268 of the fifth relay 226 is connected to the normally closed (N/C) output 240 of the fourth relay 224 while the normally open (N/O) output 264 of the fifth relay 226 is connected to the trigger (TRG) input 130 of the timer 122.

Further, the sixth relay 228 generally includes a common (COM) input 278, a normally closed (N/C) output 280 initially connected to the common (COM) input 278 through a relay contact 282. The sixth relay 228 similarly includes a normally open (N/O) output 284, a magnetic coil 286 having a positive voltage (+) input 288 and a negative voltage (−) contact 290. The common (COM) input 278 and the negative voltage (−) contact 290 are connected to a voltage source (e.g. the vehicle 12 V voltage system 156) and the common ground 150, respectively. Unlike prior relays, the sixth relay 228 does not include a diode positioned between the positive voltage (+) input 288 and the negative voltage (−) contact 290. Also unlike the prior relays, the sixth relay 228 is fed a lower voltage (e.g. 1.5 V) at the common (COM) input 278 rather than the 12 V provided to the other relays. The 1.5 V value is given by the voltage required for powering the beeper 220. The normally closed (N/C) output 280 of the sixth relay 228 is connected to the beeper 220 while the positive voltage (+) input 288 of the sixth relay 228 is connected to the normally open (N/O) outputs 164, 184 and 264 of the first relay 124, the second relay 126 and the fifth relay 226, and thus electrically coincides with the trigger (TRG) input 130 of the timer 122.

The beeper 220 of the present embodiment includes a beeper screen 300, a positive voltage (+) input 302 and a negative voltage (−) contact 304. The positive voltage (+) input 302 of the beeper 220 is connected to the normally closed (N/C) output 280 of the sixth relay 228. In turn, the negative voltage (−) contact 304 is connected to the common ground 150. Since the normally closed (N/C) output 280 of the sixth relay 228 is initially connected to the common (COM) input 278 of the sixth relay 228, the 1.5 V are provided to the positive voltage (+) input 302 of the beeper 220 and thus the beeper 220 is initially in a switched-on condition listening for a remote signal.

With continued reference to FIG. 2, the photoresistor 222 is positioned adjacent the beeper screen 300 of the beeper 220 and essentially functions, and has been schematically depicted, as a switch. Specifically, the photoresistor 222 "closes" (i.e. has a very small resistance and thus generally "allows" the flow of current therethrough) when it senses a light emitted from the beeper screen 300 in response to a signal received by the beeper 220; instead, when no signal has been received by the beeper 220 and the beeper screen 300 is off, the photoresistor "opens" (i.e. has an extremely large resistance and substantially "prevents" the flow of current therethrough). The photoresistor 222 includes a first pin 310 connected to the fourth and fifth relays 224 and 226 and a second pin 312 connected to the transistor 230.

The transistor 230 can be a commonly available transistor such as, but not limited to, transistor 2N4401, and generally includes a base 320 connected to the second pin 312 of the photoresistor 222, a collector 322 connected to the negative voltage (−) contact 270 of the fifth relay 226 and an emitter 324 connected to the common ground 150, A first resistor 326 and an adjustable second resistor 328 are provided between the emitter 324 and the base 320.

The operation of the beeper control module 120 to activate the system control module 110 will now be described. As noted above, in the initial or first condition, the normally open (N/O) output 140 of the timer 122 is open (and thus un-energized) and the GPS tracker 500, cameras 112 and DVR 114 are switched off. The fourth relay 224 initially provides power to the positive voltage (+) input 268 of the fifth relay 226 by virtue of the common (COM) input 238 of the fourth relay 224 being initially connected to the normally closed (N/C) output 240 of the fourth relay 224, which is in turn connected to the positive voltage (+) input 268 of the fifth relay 226. In turn, the photoresistor 222 is in an initial very resistive or "open" configuration such that substantially no voltage is supplied to the base 320 of the transistor 230. Thus, the transistor 230 is an open condition and the common ground 150 is not available at the collector 322 and thus at the negative voltage (−) contact 270 of the fifth relay 226. Therefore, despite the positive voltage (+) input 268 of the fifth relay 226 being energized, the negative voltage (−) contact 270 of the fifth relay 226 not being grounded prevents current from flowing through the magnetic coil 266. In consequence, the fifth relay 226 is not energized, and the common (COM) input 258 remains connected to the normally closed (N/C) output 260, while the normally open (N/O) output 264 of the fifth relay 226 remains non-energized. Thus, no voltage is supplied by the normally closed (N/C) output 260 of the fifth relay 226 to the positive voltage (+) input of the sixth relay 228 and thus the normally closed (N/C) contact 280 of the sixth relay 228 supplies power to the beeper 220 to initially maintain the beeper 220 in a switched on or "listening" condition as described above.

In this initial, non-recording and "listening" condition, the activation system 100 is in a condition to be activated by a remote signal to the beeper 220. The remote activation signal may come from a smartphone or other transmitter configured to communicate with the beeper 220. For example, a home alarm system may trigger the beeper 220 and thus the activation system 100 to start a video recording of the area around the vehicle when the vehicle is park in a garage or out in a driveway.

When the beeper 220 receives a remote signal, the beeper screen 300 of the beeper 220 switches on and illuminates. Light emitted by the beeper screen 300 is detected by the adjacent photoresistor 222, causing the photoresistor 222 to switch to a low-resistive or "closed" state in which current is allowed to flow through the photoresistor 222, from the first pin 310 of the photoresistor 222 to the second pin 312 of the photoresistor 222. This provides voltage to the base 320 of the transistor 230 causing the transistor 230 to close and provide ground (through the common ground 150) to the negative voltage (−) contact 270 of the fifth relay 226. Since the positive voltage (+) input 268 of the fifth relay 226 is initially receiving positive voltage from the fourth relay 224, the fifth relay 226 is activated and the common (COM) input 258 becomes connected to the normally open (N/O) output 264 of the fifth relay 226, thus sending an activation signal or voltage to the trigger (TRG) input 130 of the timer 122. On receiving an activation voltage from the fifth relay 226 at the trigger (TRG) input 130 of the timer 122, the timer 122 is switched on and starts the GPS tracker 500, cameras 112 and DVR 114 for a predetermined amount of time, as explained heretofore.

Additionally, when the fifth relay 226 activates, the normally open (N/O) output 264 of the fifth relay 226 sends a positive voltage to the positive voltage (+) input 288 of the sixth relay 228 causing the relay contact 282 of the sixth relay 228 to switch from the normally closed (N/C) output 280, powering the beeper 220, to the normally open (N/O) output 284. In consequence, the normally closed (N/C) output 280 becomes un-energized, and the beeper 220 becomes disconnected from power and switched off. Thus, activation of the system control module 110 by the beeper control module 120 activates the GPS tracker 500, cameras 112 and DVR 114 and also switches the beeper 220 momentarily off.

Once the beeper 220 has been switched momentarily off, the photoresistor 222 no longer detects any light and switches back to the initial high-resistive, "open" condition. This places the system back into the initial condition with the transistor 230 in an open condition and no ground available to allow the fifth relay 226 to be energized. Thus, no more voltage is applied to the trigger (TRG) input 130 of the timer 122, and the sixth relay 228 is reset into the initial condition with the common (COM) input 278 of the sixth relay 228 again supplying voltage to the beeper 220 through the normally closed (N/C) output 280 of the sixth relay 228. Thus, the beeper 220 is again switched back on to remain in the initial or "listening" mode until a further signal is received by the beeper 220.

In summary, the beeper 220 receiving an external activation signal causes: (i) the beeper control module 120 to activate the system control module 110 and thus activate the GPS tracker 500 to store and/or send real-time positioning information and activate the cameras 112 and the DVR 114 to start recording for the predetermined time; and (ii) the beeper control module 120 to reset the beeper 220 (momentarily switch off and then switch back on) and resent the trigger (TRG) input 130 of the timer 122, to return the beeper control module 120, including the beeper 220, to the initial "listening" condition in which the beeper screen 300 is off. It should be noted that the resetting of the beeper 220 and removal of a voltage supplied to the trigger (TRG) input 130 of the timer 122 does not affect the running of the GPS tracker 500, cameras 112 and DVR 114 since they are activated and powered by the timer 122 and the third relay 128 for a predetermined amount of time preset within the timer 122.

Figure 3:
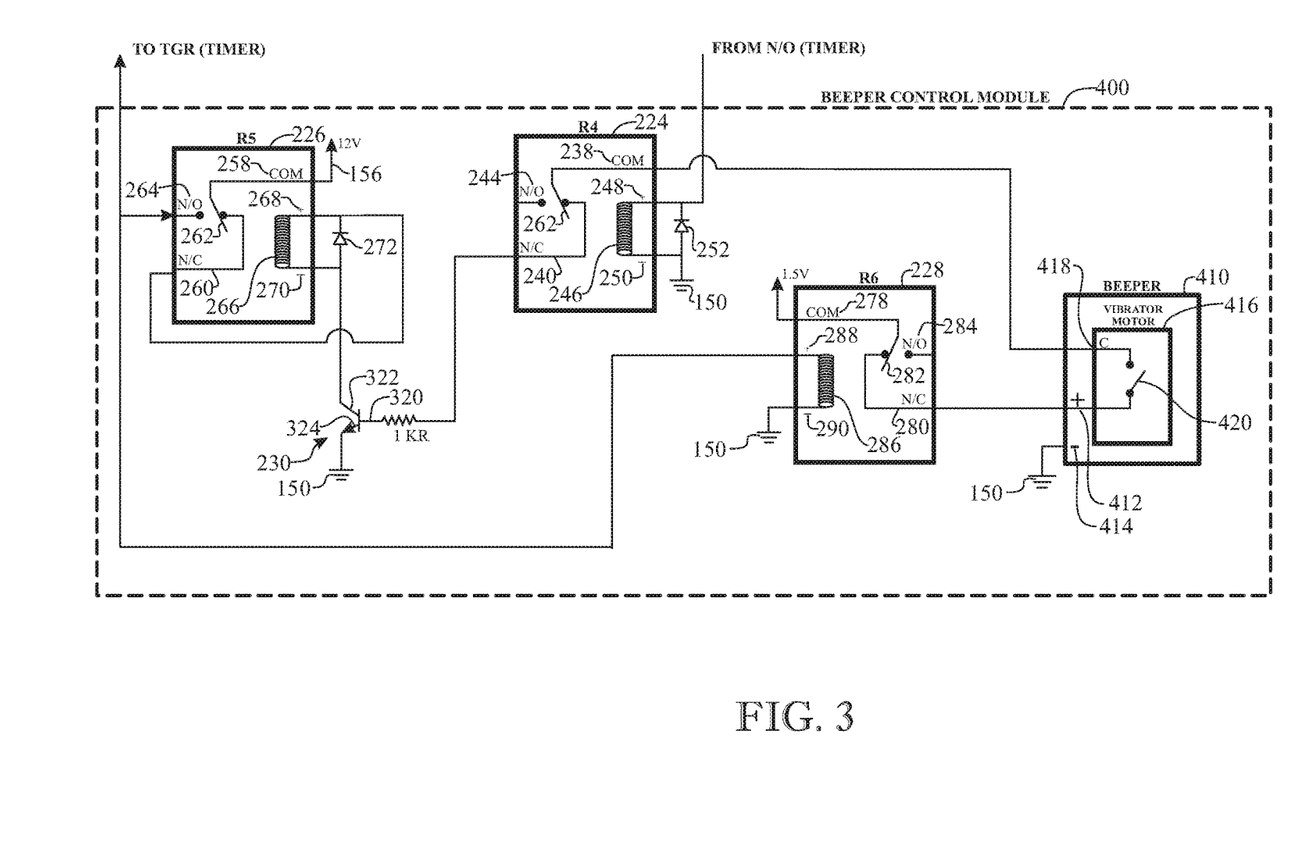
FIG. 3 presents a schematic diagram of an alternative embodiment of a beeper control module of the system of FIG. 1, activated by a signal originated in a vibratory motor of the beeper.

Turning now to FIG. 3, there is disclosed an alternative embodiment of a beeper control module for use in activating the system control module 110 of the activation system 100. In this embodiment, as will be described in greater detail hereinafter, the beeper control module 400 is operated by a signal originated in a vibratory motor 416 of a beeper 410, rather than by detecting illumination of a beeper screen, to trigger the timer 122 of the system control module 110. This control module 400 utilizes the fourth, fifth and sixth relays 224, 226 and 228 and the transistor 230 described hereinabove and in a substantially similar manner except as expressly mentioned hereinbelow. Unlike the previous embodiment, the fifth relay 226 includes a connection between the normally closed (N/C) output 260 and the positive voltage (+) input 268 of the fifth relay 226. The beeper 410, in turn, includes a positive voltage (+) input 412 connected to the normally closed (N/C) output 280 of the sixth relay 228 and a negative voltage (−) contact 414 connected to the common ground 150. In addition, the beeper 410 includes a vibratory motor 416 having a contact (C) 418 that is energized when the vibratory motor 416 vibrates, and that is otherwise not energized (thus, for clarity purposes, the contact (C) 418 has been depicted as connected to the positive voltage (+) input 412 via an imaginary switch 420). The contact (C) 418 is connected to the common (COM) input 238 of the fourth relay 224 for purposes that will be hereinafter described.

In the initial condition, the beeper 410 is turned on by the positive voltage (+) input 412 of the beeper 410 receiving power from the common (COM) input 278 of the sixth relay 228 through the normally closed (N/C) output 280 of the sixth relay 228. Thus, the beeper 410 is in an initial condition or "listening" condition turned on to receive a signal from a remote transmitter, such as, for example, a smartphone. Additionally, the fourth relay 224 is not initially energized since the common (COM) input 238 of the fourth relay 224 is connected to the contact (C) 418 of the vibratory motor 416 of the beeper 410, which is not connected to the positive voltage (+) input 412 due to the fact that the beeper 410 has not received a signal and the vibratory motor 416 is thus not vibrating. Further, since the normally closed (N/C) output 260 of the fifth relay 226 is connected to the positive voltage (+) input 268 of the fifth relay 226, the positive voltage (+) input 268 of the fifth relay 226 is initially in an energized condition by the common (COM) input 258 being connected to the normally closed (N/C) output 260. However, since the fourth relay 224 is not activated, the normally closed (N/C) output 240 of the fourth relay 224 is connected to the contact (C) 418 of the vibratory motor 416 of the beeper 410 and is thus not energized; thus, transistor 230 remains in an open configuration and ground is not provided at the negative voltage (−) contact 270 of the fifth relay 226. In consequence, the fifth relay 226 remains in a stable, non-activated situation.

When the beeper 410 receives a signal from an external device, the vibratory motor 416 is activated and the contact (C) 418 of the vibratory motor 416 is energized to the voltage available at the positive voltage (+) input 412. In consequence, the contact (C) 418 provides a voltage to the common (COM) input 238 of the fourth relay 224 to activate the fourth relay 224. This in turn energizes the base 320 of the transistor 230 through the normally closed (N/C) output 240 of the fourth relay 224. Energizing the base 320 of the transistor 230 provides ground to the negative voltage (−) contact 270 of the fifth relay 226. Since the normally closed (N/C) output 260 of the fifth relay 226 is connected to the positive voltage (+) input 270 of the fifth relay 226, the fifth relay 226 becomes activated as soon as ground is available at the negative voltage (−) contact 270 through the transistor 230. This connects the common (COM) input 258 of the fifth relay 226 to the normally open (N/O) output 264 of the fifth relay 226 to provide a 12 V voltage to the trigger (TGR) input 130 of the timer 122 of the system control module 110 thereby activating the GPS tracker 500, cameras 112 and DVR 114 for a predetermined time.

Also, once the normally open (N/O) output 264 of the fifth relay 226 is energized, the sixth relay 228 receives voltage through the positive voltage (+) input 288 of the sixth relay 228 causing the common (COM) input 278 to be switched to the normally open (N/O) output 284. Thus, the normally closed (N/C) output 280 of the sixth relay 228 is no longer energized and the power to the beeper 410 is cut off switching the beeper 410 off and deactivating the vibrator motor 416 until the beeper 410 receives a new signal from an external device.

Thus, the disclosed activation system 100 provides a timed activation of a GPS tracker 500, a set of one or more cameras 112 and a digital video recorder (DVR) 114 in response to an alarm system 116, an ignition system 118 and/or beeper control modules 120 and 400. The GPS tracker 500, set of one or more cameras 112 and DVR 114 are activated for a predetermined time given by a predetermined time setting of the timer 122. Furthermore, by using the timer 122, an instant or brief activation of the alarm system 116, ignition system 118 and/or beeper control modules 120 and 400 is sufficient to activate the GPS tracker 500, set of one or more cameras 112 and DVR 114 for relatively longer amount of time (equal to the predetermined time).

The activation system 100 depicted in the drawings is also configured to maintain the GPS tracker 500, set of one or more cameras 112 and DVR 114 activated as long as any one of the alarm system 116, ignition system 118 and/or beeper control modules 120 and 400 are activated, i.e. providing a voltage to the trigger (TGR) input 130 of the timer 122. This is achieved by having the trigger (TGR) input 130 of the timer 122 electrically connected to the normally open (N/O) output 140 of the timer 122, i.e. by having the normally open (N/O) outputs 164, 184 and 264 of the first relay 124, second relay 126 and fifth relay 226, respectively, electrically connected to the normally open (N/O) output 140 of the timer 122; said electrical connection is achieved through a bypass line 422 shown in FIG. 2. Thus, the activation system 100 of the drawings is configured to maintain the GPS tracker 500, set of one or more cameras 112 and DVR 114 activated for at least the predetermined time adjusted in the timer 122; should the alarm system 116, ignition system 118 and/or beeper control modules 120 and 400 remain activated when the predetermined time expires after activating the trigger (TGR) input 130 of the timer 122, the GPS tracker 500, set of one or more cameras 112 and DVR 114 will remain activated for as long as the alarm system 116, ignition system 118 and/or beeper control modules 120 and 400 remain activated.

Furthermore, in some embodiments, such as the embodiment depicted herein, the GPS tracker 500 can include a communications module (not shown) capable of communicating over a wireless communication network (e.g., a GSM network or other cellular network) and can be configured to communicate with a remote device over the network. For instance, the GPS tracker 500 can be configured to communicate with and receive signals from a remote cellphone over a cellular voice and/or data network. As shown, the GPS tracker 500 can include an output which can be electrically connected to the trigger (TGR) input 130 of the timer 122 over a line 510. When the GPS tracker 500 receives an activation command from the remote device, the GPS tracker 500 may activate (i.e. electrically power) said output, thus providing a voltage to the trigger (TGR) input 130 of the timer 122 and consequently activating the cameras 112 and DVR 114. Therefore, in the embodiment depicted herein, the cameras 112 and DVR 114 can be activated by a remote user, for instance by having the user operate a software application on his or her smartphone to cause the smartphone to send the activation command to the GPS tracker 500 over the network.

Since many modifications, variations, and changes in detail can be made to the described preferred embodiments of the invention, it is intended that all matters in the foregoing description and shown in the accompanying drawings be interpreted as illustrative and not in a limiting sense. Thus, the scope of the invention should be determined by the appended claims and their legal equivalents.

What is claimed is:

1. An activation system for providing timed activation of a vehicle camera system in response to an external signal, comprising:
   a timer having a common input connected to an electrical power source, a trigger input, a normally open output connected to at least one electronic device of a vehicle camera system, and a normally closed output, wherein said timer is switchable, in response to a triggering voltage being applied to said trigger input, from:
      an initial position in which the common input is connected to the normally closed output, to
      an activated position in which the common input is connected to the normally open output, and in which electrical power from the electrical power source is provided to the at least one electronic device of the vehicle camera system for a predetermined amount of time; and
   a triggering relay comprising:
      a common input, a positive voltage input, a negative voltage input, a normally closed output, a normally open output and a relay contact, wherein
      the common input of said triggering relay is connected to an electrical power source, wherein
      wherein the normally open output of said triggering relay is connected to said trigger input of said timer, and further wherein
      said relay contact is switchable, in response to a voltage being applied between the positive and negative voltage inputs of said triggering relay, from an initial position connecting said common input of said triggering relay to said normally closed output of said triggering relay, to an activated position connecting said common input of said triggering relay to said trigger input of said timer via said normally open output of said triggering relay, wherein, in said activated position of said relay contact, said electrical power source connected to the common input of said triggering relay provides said triggering voltage to said trigger input of said timer.

2. The activation system of claim 1, wherein the electrical power source connected to the common input of the timer is the same as the electrical power source connected to the common input of the triggering relay.

3. The activation system of claim 2, wherein the electrical power source connected to both the common input of the timer and the common input of the triggering relay is a 12-Volt electrical system of a vehicle.

4. The activation system of claim 1, wherein at least one of the positive and negative voltage inputs of the triggering relay is electrically connected to a vehicle alarm system, and further wherein said voltage applied between the positive and negative voltage inputs of the triggering relay is applied responsively to said vehicle alarm system activating an alarm.

5. The activation system of claim 1, wherein at least one of the positive and negative voltage inputs of the triggering relay are electrically connected to a vehicle ignition system, and further wherein said voltage applied between the positive and negative voltage inputs of the triggering relay is applied responsively to said vehicle ignition system being ignited.

6. The activation system of claim 1, wherein said at least one electronic device comprises a camera.

7. The activation system of claim 1, wherein said at least one electronic device comprises a digital video recorder.

8. The activation system of claim 1, herein said at least one electronic device comprises a geolocation tracker.

9. The activation system of claim 1, further comprising an additional relay having a common input, a positive voltage input, a negative voltage input, a normally closed output, a normally open output and a relay contact, wherein the common input of said additional relay is connected to an electrical power source, wherein the normally open output of said additional relay is connected to said at least one electronic device, and further wherein said relay contact of said additional relay is switchable, in response to a voltage being applied between the positive and negative voltage inputs of said additional relay by the normally open output of the timer, from an initial position connecting said common input of said additional relay to said normally closed output of said additional relay, to an activated position connecting said common input of said additional relay to said at least one electronic device via said normally open output of said additional relay.

10. The activation system of claim 1, further comprising a beeper configured to receive an external wireless signal, the activation system further comprising a beeper-activated relay having a normally open output electrically connected to the trigger input of the timer, wherein the beeper-activated relay is switchable to an activated position, in which the normally open output of the beeper-activated relay is powered, responsively to the beeper receiving said external wireless signal.

11. The activation system of claim 10, further comprising a photoresistor switch electrically connected to the beeper-activated relay, wherein the photoresistor switch is configured to switch to a closed position in response to illumination of a screen of the beeper caused by the beeper receiving said external wireless signal and to switch the beeper-activated relay to said activated position.

12. The activation system of claim 10, wherein the beeper comprises a vibratory motor including a vibratory motor contact electrically connected to the beeper-activated relay, wherein the vibratory motor contact is configured to switch to a closed position in response to the vibratory motor being activated consequently to the beeper receiving said external wireless signal and to switch the beeper-activated relay to said activated position.

13. An activation system for providing timed activation of a vehicle camera system in response to an external signal, comprising:
  a timer having a common input connected to an electrical power source, a trigger input, a normally open output connected to at least one electronic device of a vehicle camera system, and a normally closed output, wherein said timer is switchable in response to a triggering voltage being applied to said trigger input, from:
    an initial position in which the common input is connected to the normally closed output, to
    an activated position in which the common input is connected to the normally open output, and in which electrical power from the electrical power source is provided to the at least one electronic device of the vehicle camera system for a predetermined amount of time; and
  at least one of a vehicle alarm system and a vehicle ignition system electrically connected to said trigger input of said timer and configured to provide said triggering voltage to the trigger input.

14. The activation system of claim 13, wherein said at least one of a vehicle alarm system and a vehicle ignition system are electrically connected to said trigger input of said timer via a triggering relay, said triggering relay comprising:
  a common input, a positive voltage input, a negative voltage input, a normally closed output, a normally open output and a relay contact, wherein
  said at least one of a vehicle alarm system and a vehicle ignition system is electrically connected to the triggering relay and configured to provide a voltage between said positive voltage input and said negative voltage input of said triggering relay, wherein
  the common input of said triggering relay is connected to an electrical power source, wherein
  the normally open output of said triggering relay is connected to said trigger input of said timer, and further wherein
  said relay contact of said triggering relay is switchable, in response to said voltage being applied between the positive and negative voltage inputs of said triggering relay, from an initial position connecting said common input of said triggering relay to said normally closed output of said triggering relay, to an activated position connecting said common input of said triggering relay to said trigger input of said timer via said normally open output of said triggering relay, wherein, in said activated position of said relay contact, said electrical power source connected to the common input of said triggering relay provides said triggering voltage to said trigger input of said timer.

15. The activation system of claim 13, wherein said at least one electronic device comprises a camera.

16. The activation system of claim 13, wherein said at least one electronic device comprises a digital video recorder.

17. The activation system of claim 13, wherein said at least one electronic device comprises a geolocation tracker.

18. An activation system for providing timed activation of a vehicle camera system in response to an external signal, comprising:
  a timer having a common input, a normally open output, a normally closed output and a trigger input, wherein the common input is connected to an electrical power source and the normally open output is connected to one or more cameras carried by a vehicle;
  at least one of a vehicle alarm system and a vehicle ignition system electrically connected to said trigger input of said timer; wherein
  said timer is switchable, in response to a voltage applied at said trigger input by said at least one of a vehicle alarm system and a vehicle ignition system, between:
    an initial position in which the common input is connected to the normally closed output, and
    an activated position in which the common input is connected to the normally open output, and in which electrical power from the electrical power source is provided to the one or more cameras for a predetermined amount of time.

19. The activation system of claim 18, wherein said normally open output of said timer is further electrically connected to a digital video recorder carried by said vehicle.

20. The activation system of claim 18, wherein said normally open output of said timer is further electrically connected to a geolocation tracker carried by said vehicle.

* * * * *